W. SCHWENE, DEC'D.
C. H. JONS, ADMINISTRATOR.
SHEET METAL WHEEL.
APPLICATION FILED APR. 1, 190
1,071,099.
Patented Aug. 26, 1913.
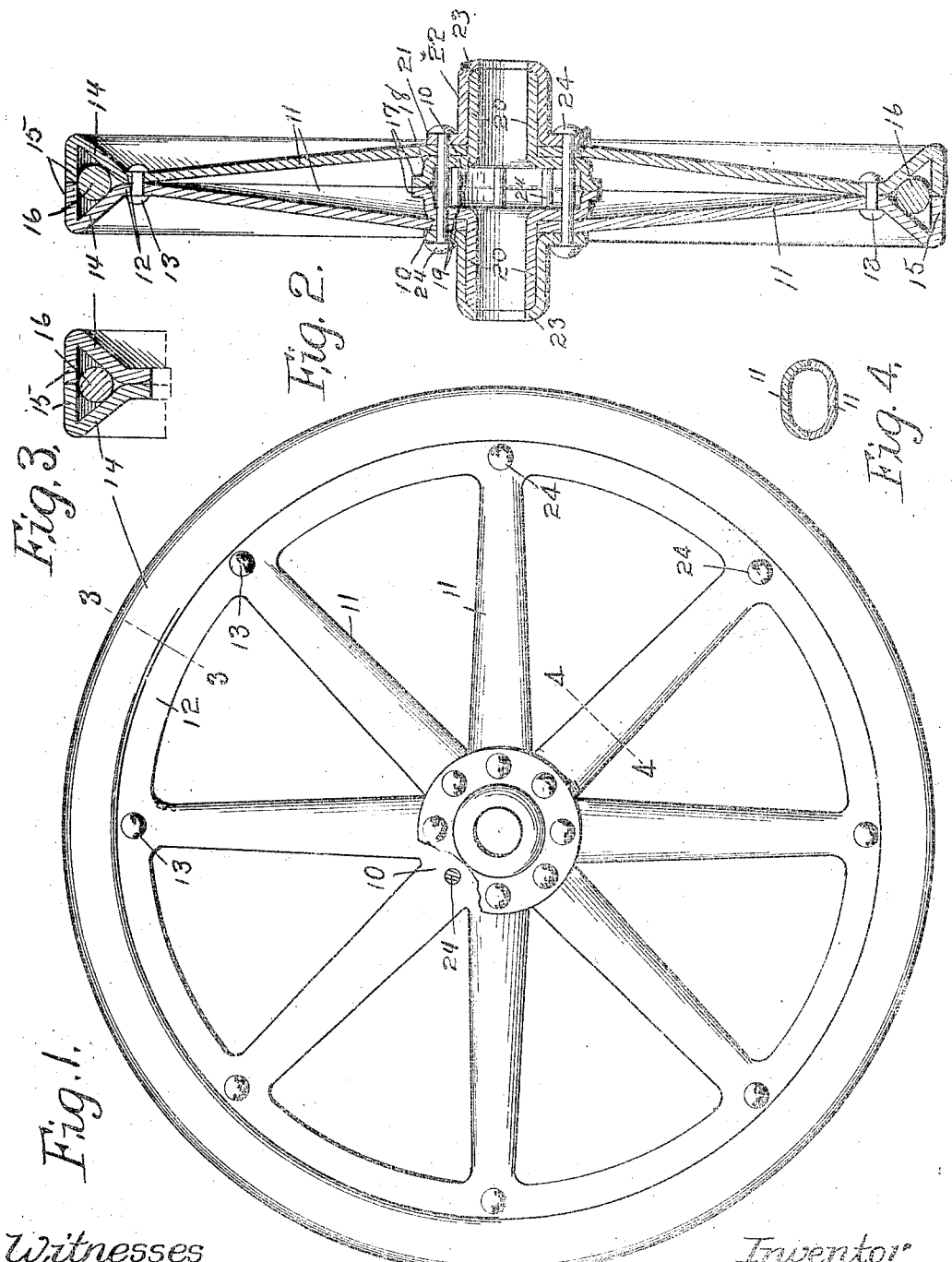

UNITED STATES PATENT OFFICE.

WILLIAM SCHWENE, OF OGDEN, IOWA; CLAUS H. JONS, ADMINISTRATOR OF SAID SCHWENE, DECEASED, ASSIGNOR, BY MESNE ASSIGNMENTS, TO WAGNER MANUFACTURING COMPANY, OF CEDAR FALLS, IOWA, A CORPORATION OF IOWA.

SHEET-METAL WHEEL.

1,071,099.  Specification of Letters Patent.  Patented Aug. 26, 1913.

Application filed April 1, 1907. Serial No. 365,685.

*To all whom it may concern:*

Be it known that I, WILLIAM SCHWENE, a citizen of the United States, residing at Ogden, in the county of Boone and State of Iowa, have invented a certain new and useful Sheet-Metal Wheel, of which the following is a specification.

The object of my invention is to provide an improved wheel of simple and inexpensive construction that may be formed complete of sheet metal cut out and shaped by dies and that may be quickly and easily assembled and that will have a maximum of strength with a minimum of weight.

My invention consists in the certain details in the construction, arrangement and combination of the various parts comprising the wheel, whereby the objects contemplated are attained, as hereinafter more fully set forth, pointed out in my claims and illustrated in the accompanying drawings, in which—

Figure 1 shows a side elevation of a complete wheel embodying my invention. Fig. 2 shows a central, sectional view of same. Fig. 3 shows a sectional view on the line 3—3 of Fig. 1, and Fig. 4 shows a sectional view on the line 4—4 of Fig. 1.

Referring to the accompanying drawings, it will be noted that the spoke, felly and tire portions of the wheel are formed of two pieces of sheet metal. Each piece comprises a central disk-shaped portion 10 with the central opening to admit the hub portion, hereinafter described, and a number of spoke portions 11 radiating from the part 10, each being curved, as shown in Fig. 4, so that the edges of one spoke member will engage and rest upon the corresponding edges of the mating spoke member. At the outer ends of the spoke members is the flat felly portion 12 through which rivets 13 are passed for connecting them together. Beyond the part 12 the felly members incline away from each other at 14 and the edges thereof are inclined straight inwardly toward each other forming the tire portions 15, the adjacent edges of which touch each other as shown in Figs. 2 and 3.

In order to firmly brace and reinforce the inner edges of the tire portions 15, I have placed a round wire or rod 16 within the space inclosed between the felly portions 14 and the tire portions 15, said wire or rod touching the inner edges of the tire portions 15 and being firmly and securely held in a central position by the inclined walls of the felly portions 14 so that said reinforcing wire or rod does not need any other fastening device. In this way the tread portion of the wheel is made substantially as firm and strong as though it were formed solid of a single piece of metal.

The hub portion of the wheel is formed of two inner hub members and two outer hub members. Each inner hub member comprises an annular flange 17, a part 18 extending from the flange 17 laterally to engage the inner edge of the part 10, a disk-shaped part 19 to lie flat against the inner face of the part 10 and a tubular bearing portion 20 extending laterally from the part 19 and projected beyond the part 10.

The outer hub members, each comprise an annular flange 21 to lie against the outer face of the part 10 and a tubular hub member 22 extended laterally and fitting the exterior of the part 20. The outer edge of the part 22 is turned inwardly at 23 to engage the edge of the part 20. I connect the hub members with the part 10 by means of a number of rivets 24 passed through the parts 10, 19 and 21, as clearly shown in Fig. 2.

All of the parts of my improved wheel, except the wire or rod 16, may be made of sheet metal of suitable dies.

In assembling the parts, I first extend the tubular portions 20 of the inner hub members through the sides of the parts 10 and then place the wire or rod 16 within the felly and tire portion and I finally place the outer hub members in position and then insert the rivets. By this arrangement of parts, the hub portion may easily be formed with a smooth inner bearing which does not need to be bored out after the wheel is assembled. These inner hub members by having their inner portions in engagement with each other firmly brace the hub portion of the wheel against crushing strains tending to force the parts 10 toward each other. The outer hub portions serve to brace and reinforce the inner ones and they form a double thickness of metal at the point where great strains occur and the rivets firmly hold the hub members together and in proper positions with relation to each other.

The reinforcing wire 16 arranged within the felly and tire portions obviously holds these parts properly in position against crushing strains and in this way a wheel of great strength and durability is provided that is made complete of sheet metal and that is of comparatively light weight.

Having thus described my invention, what I claim and desire to secure by Letters Patent of the United States, therefor is—

1. In a sheet metal wheel, the combination of two sheet metal spoke members and two sheet metal hub members, each of said hub members comprising an annular flange, an outwardly extended portion adjacent to the annular flange, a disk-shaped portion to engage the inner face of the spoke portion and a tubular bearing portion extended laterally to a point beyond the spoke portion, the said annular flange portions of the hub members being in engagement with each other and rivets passed through the spoke portions and the said disk portions.

2. In a sheet metal wheel, the combination of sheet metal spoke portions, a pair of inner hub members in engagement with each other between the spoke portions and having tubular extensions projected laterally beyond the spoke portions, two outer hub members engaging the outer faces of the spoke portions and engaging the tubular extensions of the inner hub members and rivets passed through the outer hub members, the spoke members and the inner hub members.

WILLIAM SCHWENE.

Witnesses:
W. M. ROSEN,
CHAS. G. LINDHOLM.